US010710490B2

(12) United States Patent
Crespo (10) Patent No.: US 10,710,490 B2
(45) Date of Patent: Jul. 14, 2020

(54) FOOD PREPARATION VEHICLES POWERED BY ALTERNATIVE ENERGY

(71) Applicant: Max Crespo, New York, NY (US)

(72) Inventor: Max Crespo, New York, NY (US)

( * ) Notice: Subject to any disclaimer, the term of this patent is extended or adjusted under 35 U.S.C. 154(b) by 597 days.

(21) Appl. No.: 15/347,406

(22) Filed: Nov. 9, 2016

(65) Prior Publication Data
US 2018/0126890 A1    May 10, 2018

(51) Int. Cl.
| | | |
|---|---|---|
| *B60P 3/025* | (2006.01) | |
| *B60K 6/00* | (2006.01) | |
| *B60K 15/03* | (2006.01) | |
| *F02M 21/02* | (2006.01) | |
| *F02M 35/10* | (2006.01) | |
| *F24C 15/30* | (2006.01) | |

(52) U.S. Cl.
CPC .............. *B60P 3/0257* (2013.01); *B60K 6/00* (2013.01); *B60K 15/03006* (2013.01); *F02M 21/0215* (2013.01); *F02M 21/0221* (2013.01); *F02M 21/0239* (2013.01); *F02M 35/10* (2013.01); *F24C 15/30* (2013.01); *B60K 2015/03309* (2013.01); *B60Y 2200/40* (2013.01); *B60Y 2200/92* (2013.01); *B60Y 2400/10* (2013.01); *B60Y 2400/106* (2013.01); *B60Y 2400/112* (2013.01); *B60Y 2400/216* (2013.01); *B60Y 2400/60* (2013.01); *Y02T 10/32* (2013.01)

(58) Field of Classification Search
USPC ........................................................ 126/276
See application file for complete search history.

(56) References Cited

U.S. PATENT DOCUMENTS

| | | | |
|---|---|---|---|
| 4,183,332 A * | 1/1980 | Hofbauer ......... | F02M 35/10118 123/184.42 |
| 4,632,836 A | 12/1986 | Abbott et al. | |
| 6,412,588 B1 * | 7/2002 | Scott ................... | B60K 15/013 137/267 |
| 6,474,101 B1 * | 11/2002 | Quine ...................... | F17C 7/04 62/50.2 |
| 2003/0029390 A1 | 2/2003 | Campion | |

(Continued)

OTHER PUBLICATIONS

Max Crespo, Inventor Statement, Nov. 8, 2016, pp. 1-3.

(Continued)

*Primary Examiner* — Steven B McAllister
*Assistant Examiner* — John E Bargero
(74) *Attorney, Agent, or Firm* — Fish & Richardson P.C.

(57) ABSTRACT

An example system includes a vehicle having a propulsion system, an electric generator, a cooking apparatus, and a fuel storage apparatus configured to store compressed natural gas (CNG). The system also includes a fuel regulation apparatus coupled to the fuel storage apparatus and configured to deliver CNG to the electric generator, the propulsion system, and the cooking apparatus. The system also includes an air intake system configured to intake air from an ambient environment via an intake port, and supply the air to at least one of the propulsion system or the electric generator. The system also includes an exhaust system configured to expel exhaust air from at least one of the propulsion system or the electric generator into the ambient environment via an exhaust port. The intake port is physically separated from the exhaust port.

10 Claims, 3 Drawing Sheets

(56) References Cited

U.S. PATENT DOCUMENTS

| 2008/0115989 | A1* | 5/2008 | Matte | F01N 3/021 |
| | | | | 180/68.1 |
| 2014/0138045 | A1* | 5/2014 | Sloane | B60H 1/00507 |
| | | | | 165/42 |
| 2014/0370167 | A1 | 12/2014 | Garden | |
| 2017/0115009 | A1* | 4/2017 | Ramphos | F24C 15/2042 |

OTHER PUBLICATIONS

International Search Report dated Jan. 23, 2018 in corresponding application No. PCT/US2017/060516 filed on Nov. 8, 2017.
Winter, Amy. Natural Gas: A Cleaner-Running Option for Food Truck Fleet. Article [online]. Mar. 2014 [retrieved on Mar. 1, 2018]. Retrieved from the internet: .CURL: http://www.businessfleet.com/article/story/2014/11/a-cleaner-running-food-truck-fleet.aspx>.
Energy Vision. The Food Cart of the 21st Century. Report [online]. May 11, 2015 [retrieved on Jan. 3, 2018]. Retrieved from the internet: <URL: http://energy-vision.org/ev-publications/21st-Century-Food-Cart.pdf>.

* cited by examiner

FOOD PREPARATION VEHICLES POWERED BY ALTERNATIVE ENERGY

TECHNICAL FIELD

The disclosure generally relates to vehicles for preparing and serving food.

BACKGROUND

Vehicles can be used for the transportation of people or cargo. As an example, vehicles such as cars, trucks, buses, boats, airplanes, motorcycles, and other apparatuses can be used to convey people and/or physical objects between two or more physical locations.

Vehicles also can be configured for the preparation and serving of food. As an example, a vehicle can include one or more cooking apparatuses (e.g., stoves, ovens, water heaters, griddles, grills, etc.), food storage apparatuses (e.g., refrigerators, coolers, freezers, etc.), and power sources to operate each of the cooking and food storage apparatuses (e.g., electric generators, containers of fuel, etc.). Motor vehicles (e.g., cars, trucks, van, or buses) configured in this manner are often referred to as "food trucks," "catering trucks," or "lunch wagons."

In some cases, vehicles configured in this manner enable users to prepare and serve food in a mobile environment. For example, a food truck can include a stove to prepare food and a tank of fuel (e.g., propane) to operate the stove. The user can drive the food truck to a particular location, and upon arrival, prepare and serve food to consumers at that location. The user can subsequently relocate the food truck to another location, and prepare and serve food to consumers at the new location. This enables the user to prepare and serve food with a great degree of flexibility and mobility. This also enables consumers to obtain food more conveniently (e.g., from closer locations, from locations with otherwise limited food options, from locations that are unsuitable for a permanent stationary food preparation facility, and so forth).

SUMMARY

In general, in an aspect, a system includes a vehicle having a propulsion system, an electric generator, a cooking apparatus, a battery, a solar panel, and a fuel storage apparatus configured to store compressed natural gas (CNG) at a first pressure. The system also includes a fuel regulation apparatus coupled to the fuel storage apparatus and configured to receive CNG from the fuel storage apparatus, provide CNG at a second pressure to the propulsion system of the vehicle, and provide CNG at a third pressure to the electric generator. The second pressure and the third pressure are different than the first pressure. The fuel regulation apparatus is also configured to provide CNG at the third pressure to the cooking apparatus. The propulsion system is configured to propel the vehicle using the CNG at the second pressure as fuel. The electric generator is configured to generate electrical energy using the CNG at the third pressure as fuel. The cooking apparatus is configured to generate thermal energy using the CNG at the third pressure as fuel. The solar panel is configured to generate electrical energy in response to light incident upon the solar panel. The battery is configured to store at least a portion of the electrical energy generated by the electric generator and the solar panel.

Implementations of this aspect can include one or more of the following features.

In some implementations, the second pressure can be less than the first pressure.

In some implementations, the third pressure can be less than the first pressure.

In some implementations, the first pressure can be approximately 3600 psi, the second pressure can be approximately 120 psi, and the third pressure can be approximately 1 psi.

In some implementations, the fuel storage apparatus can include one or more gas storage cylinders configured to store the CNG at the first pressure.

In some implementations, the fuel regulation apparatus can include a first gas regulator coupled to the fuel storage apparatus and configured to provide CNG at the second pressure to the propulsion system of the vehicle. The fuel regulation apparatus can also include a second gas regulator coupled to the fuel storage apparatus and configured to provide CNG at the third pressure to the electric generator and the cooking apparatus.

In some implementations, the electric generator, the cooking apparatus, the battery, the solar panel, the fuel storage apparatus, and the fuel regulation apparatus can be each secured to the vehicle.

In some implementations, the cooking apparatus can be disposed within the vehicle.

In some implementations, the solar panel can be secured to an exterior surface of the vehicle.

In some implementations, the system can further include an electrical panel. The electrical panel can be configured to receive electrical energy generated by the electric generator and the solar panel, provide at least a portion of the received electrical energy to one or more electrical devices.

In some implementations, the electrical panel can be further configured to receive additional electrical energy from a power source external to the vehicle, and provide at least a portion of the received additional electrical energy to the one or more electrical devices.

In some implementations, the power source external to the vehicle can be an electrical grid coupled to a remote power station.

In some implementations, the one or more electrical devices can include at least one refrigerator or freezer.

In some implementations, the CNG can include methane.

In some implementations, the cooking apparatus can be a stove, an oven, a water heater, a griddle, or a grill.

In some implementations, the propulsion system and the electric generator do not operate using gasoline or diesel as fuel.

In some implementations, the vehicle does not contain any propulsion systems or electric generators that operate using gasoline or diesel as fuel.

In some implementations, the battery can be a lithium ion battery or a lead battery.

In some implementations, the electric generator can be configured to generate alternating current using the CNG at the third pressure as fuel.

In some implementations, the vehicle can be a car, a truck, a bus, or a van.

In general, in another aspect, a system includes a vehicle having a propulsion system, an electric generator, a cooking apparatus, and a fuel storage apparatus configured to store compressed natural gas (CNG). The system also includes a fuel regulation apparatus coupled to the fuel storage apparatus and configured to deliver CNG to the electric generator, the propulsion system, and the cooking apparatus. The system also includes an air intake system configured to intake air from an ambient environment via an intake port, and supply the air to at least one of the propulsion system or the electric generator. The system also includes an exhaust system configured to expel exhaust air from at least one of the propulsion system or the electric generator into the ambient environment via an exhaust port. The intake port is physically separated from the exhaust port.

Implementations of this aspect can include one or more of the following features.

In some implementations, the intake port can be positioned along a first side of the vehicle 100. The exhaust port can be positioned along a second side of the vehicle 100 different than the first side.

In some implementations, the intake port can be positioned along a lateral side of the vehicle 100. The exhaust port can be positioned along a top side of the vehicle 100.

In some implementations, the air intake system can be configured to intake air from the ambient environment in a first direction. The exhaust system can be configured to expel exhaust air in a second direction different than the first direction.

In some implementations, the air intake system can include a first air chamber disposed between the intake port and at least one of the propulsion system or the electric generator. The air intake system can be configured to intake air into the air chamber from the ambient environment via the intake port, and supply the air from the air chamber to at least one of the propulsion system or the electric generator.

In some implementations, the first air chamber can extend along at least 50% of a height of the vehicle.

In some implementations, the exhaust system can include a second air chamber disposed between the exhaust port and at least one of the propulsion system or the electric generator. The exhaust system can be configured to direct exhaust air from at least one of the propulsion system or the electric generator into the second air chamber, and expel the exhaust air from the second air chamber into the ambient environment via the exhaust port.

In some implementations, the second air chamber can extend along at least 50% of a height of the vehicle.

Details of one or more implementations are set forth in the accompanying drawings and the description below. Other features, aspects, and potential advantages will be apparent from the description and drawings, and from the claims.

DETAILED DESCRIPTION

A vehicle can be configured for the mobile preparation and serving of food. As an example, a vehicle can include a propulsion system (e.g., one or more engines, transmissions, and drivetrains), and one or more cooking apparatuses, food storage apparatuses, electrical devices, and other devices that enable a user to cook, store, and dispense food to consumers in a mobile environment.

In some cases, a vehicle can be powered, either partially or entirely, by alternative fuel. For instance, alternative fuels can be used to power the vehicle's propulsion system, the vehicle's food preparation devices (e.g., cooking apparatuses and food storage apparatuses), and/or other devices. Alternative fuels can include, for example, compressed natural gas (e.g., a gaseous fuel composed, either partially or entirely, by methane) stored at a relatively high pressure (e.g., up to 3,600 psi, or some other relatively high pressure).

In some cases, a vehicle can be powered by compressed natural gas instead of gasoline or diesel. For example, a vehicle can include an engine, one or more cooking apparatuses, and one or more electric generators (e.g., for powering electrical devices), each of which operate solely or substantially solely using compressed natural gas as fuel.

This configuration can be advantageous, as it enables a user to operate the vehicle in a cleaner, more environmentally conscious manner. For instance, during operation, a vehicle powered by compressed natural gas can emit fewer pollutants (e.g., carbon dioxide ($CO_2$), unburned hydrocarbons (UHC), carbon monoxide (CO), nitrogen oxides ($NO_x$), sulfur oxides ($SO_x$), and PM (particulate matter)) compared to a vehicle powered by gasoline or diesel. As such, the environmental impact of operating the vehicle can be relatively low.

Further, this also enables a user to operate the vehicle more safely. For example, as a vehicle powered by compressed natural gas can emit fewer pollutants into the surrounding environment, the vehicle can be operated in areas with relatively limited ventilation (e.g., an enclosed or partially enclosed area, such as the interior of a building), without endangering or discomforting others in the area. Further, as compressed natural gas is lighter than the ambient air in its uncompressed state, compressed natural gas that is inadvertently released from the vehicle (e.g., due to a leak or damage to the vehicle) is readily dispersed into the air, and is less likely to collect or "pool" in a localized area (e.g., in a low-lying location). As a result, the risk of fire or explosion is reduced. In comparison, a fuel leak in a vehicle operating using a fuel that is liquid (e.g., gasoline) or a gas that is heavier than the ambient air in its uncompressed state (e.g., propane) may result in the collection or pooling of fuel, thereby increasing the risk of fire or explosion.

In some cases, it may be advantageous to operate a vehicle's propulsion system (e.g., one or more engines) and the vehicle's other devices (e.g., cooking apparatuses and electric generators) using compressed natural gas as a common fuel. In some cases, this can be more convenient for the user, as it enables the user to simultaneously replenish fuel for both the vehicle's propulsion and the vehicle's cooking functionality.

In some cases, this can also provide safety and regulatory benefits. For example, in some jurisdictions, safety regulations require that certain types of fuel (e.g., propane) be stored at least a certain distance from possible sources of ignition (e.g., a gasoline or diesel fueled combustion engine) due to the danger of ignition and explosion. For instance, in some cases, regulations may prohibit a propane tank from being stored within 20 feet of a spark ignited engine. Given the relatively confined nature of a vehicle, it may be difficult to configure a vehicle having mixed fuel types (e.g., gasoline or diesel for propulsion and propane for cooking) to satisfy these requirements. Further, in some cases, regulation may prohibit the storage of propane tanks within a passenger compartment of a vehicle. In contrast, using a common fuel for propulsion and cooking enables the vehicle to be arranged in a more flexible manner, reduces the risk of ignition and explosion, and reduces the complexity of satisfying safety regulations.

In some cases, this enables a vehicle to meet United States Department of Transportation (DOT) regulations, United States Environmental Protection Agency (EPA) regulations, and/or regulations promulgated by other governmental entities regarding the manufacturing, distribution, and/or operation of motor vehicles, electric generators, cooking apparatuses, fueling systems, or other devices.

Figure 1:
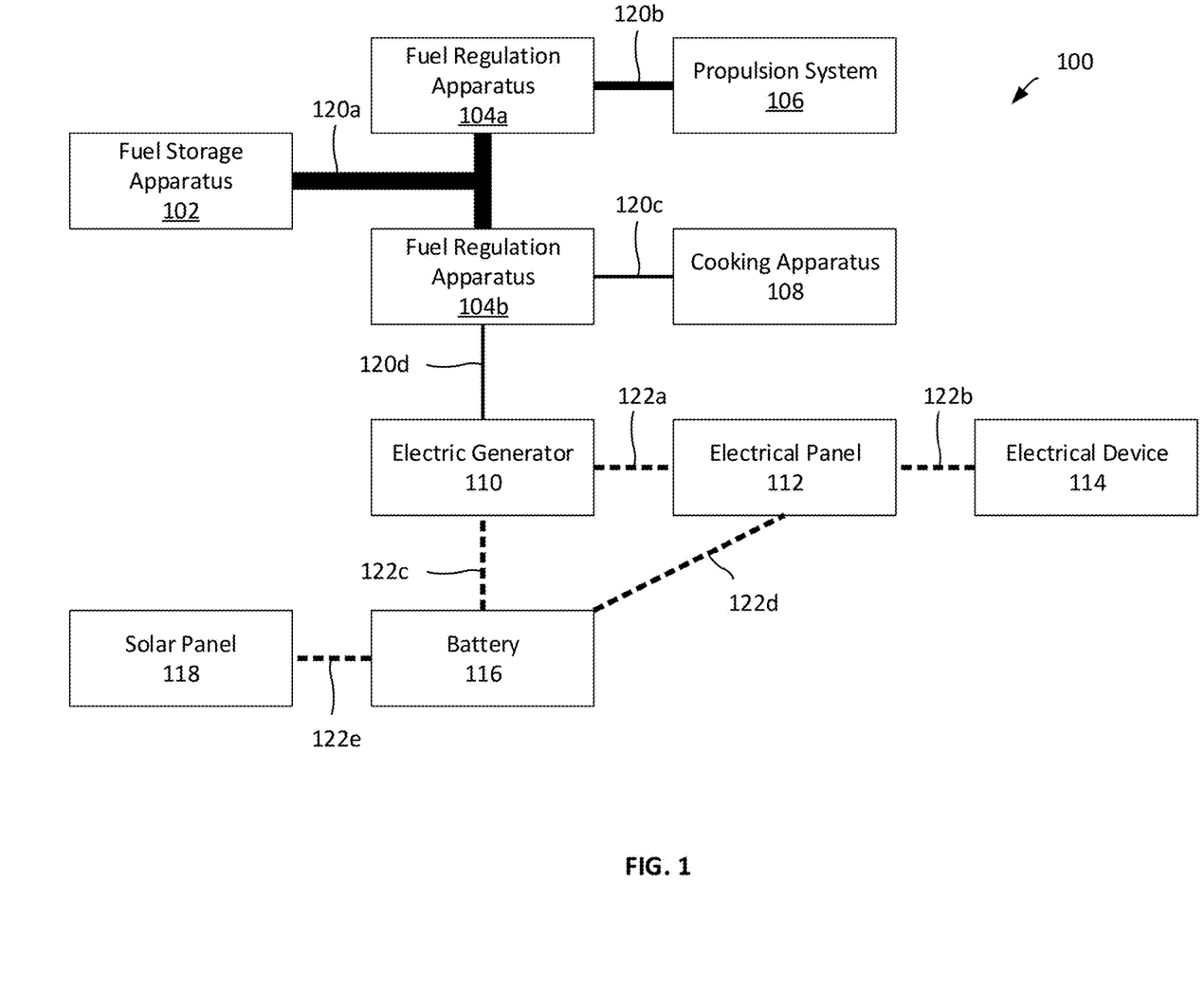
FIG. 1 is a schematic diagram of an example vehicle for preparing and serving food.

An example vehicle 100 configured for the preparation and serving of food is shown schematically in FIG. 1. Examples of vehicle 100 include cars, trucks, buses, vans, boats, airplanes, and motorcycles. In some cases, the vehicle 100 is a "food truck" (e.g., a motor vehicle, such as a car, a truck, a bus, or a van equipped to prepare and serve food).

The vehicle 100 includes a fuel storage apparatus 102 that stows fuel used to power the operation of the vehicle 100. In some cases, the fuel storage apparatus 102 can store a gaseous fuel, such as compressed natural gas (CNG). In some implementations, CNG can include approximately 85% to 99.9% methane by volume, and lesser and/or trace amounts of amounts of ethane, propane, iso-butane, n-butane, pentane, n-pentane, nitrogen, carbon dioxide, hexane, oxygen, carbon monoxide, and/or other substances.

The fuel storage apparatus 102 can store gaseous fuel in a compressed or pressurized state. For example, the fuel storage apparatus 102 can store CNG stored at a relatively high pressure (e.g., up to 3,600 psi, or some other relatively high pressure). In some cases, the fuel storage apparatus 102 can include one or more containers or vessels for storing gaseous fuel in a pressurized state, such as one or more gas storage tanks, cylinders, or reservoirs.

In some cases, the fuel storage apparatus 102 can be permanently mounted to the vehicle 100, and gaseous fuel can be introduced into the fuel storage apparatus 102 via a suitable conduit. For example, the fuel storage apparatus 102 can include one or more gas storage tanks or cylinders that are permanently mounted to the vehicle 100, and the gas storage tanks or cylinders can be filled via a pipe, hose, or tube coupled to a source of gaseous fuel. In some cases, portions or the entirety of the fuel storage apparatus 102 can be detachably mounted to the vehicle 100, such that the gas storage tanks or cylinders can be removed and re-attached to the vehicle 100 as needed. For example, the fuel storage apparatus 102 can include one or more gas storage tanks or cylinders that are detachably mounted to the vehicle 100 (e.g., a detachable bracket, harness, mount, or other securing mechanism), such that the fuel storage apparatus 102 can be filled with gaseous fuel at a location remote from the vehicle 100 and reattached to the vehicle 100.

The fuel storage apparatus 102 provides gaseous fuel to two fuel regulation apparatuses 104a and 104b via gas conduits 120a and 120b, respectively (e.g., tubes, pipes, hoses, or other components capable of conveying gaseous fuel). Each of the fuel regulation apparatuses 104a-b receives the gaseous fuel at a particular pressure from the fuel storage apparatus 102, and outputs the gaseous fuel at a different respective pressure suitable for use by a downstream device. For example, as shown in FIG. 1, the fuel regulation apparatus 104a is positioned upstream from a propulsion system 106, and the fuel regulation apparatus 104b is positioned upstream from a cooking apparatus 108 and an electric generator 110. The fuel regulation apparatus 104a receives gaseous fuel at a particular pressure from the fuel storage apparatus 102, and outputs the gaseous fuel at a different pressure to the propulsion system 106 via the gas conduit 120b. Similarly, the fuel regulation apparatus 104b receives gaseous fuel a particular pressure from the fuel storage apparatus 102, and outputs the gaseous fuel at a different pressure to the cooking apparatus 108 and the electric generator 110 via the gas conduits 120c and 120d, respectively.

In some cases, the fuel regulation apparatuses 104a-b can reduce the pressure of gaseous fuel received from the fuel storage apparatus 102, and provide gaseous fuel at the reduced pressure to a downstream device. As an example, the propulsion system 106 can operate using CNG as fuel, but at a lower pressure (e.g., approximately 120 psi, such as between 100 psi and 140 psi) than that of the CNG provided by the fuel storage apparatus 102 (e.g., approximately 3600 psi, such as between 2,900-3,600 psi, or up to 3, 6000 psi). Likewise, the cooking apparatus 108 and the electric generator 110 also can operate using CNG as fuel, but at a lower pressure (e.g., approximately 1 psi, such as between 0.8 psi and 1.2 psi) than that of the CNG provided by the fuel storage apparatus 102. To account for these differences, the fuel regulation apparatus 104a can reduce the pressure of CNG received from the fuel storage apparatus 102 to approximately 120 psi, and output the reduced pressure CNG to the propulsion system 106 via the gas conduit 120b. Similarly, the fuel regulation apparatus 104b can reduce the pressure of CNG received from the fuel storage apparatus 102 to approximately 1 psi, and output the reduced pressure CNG to the cooking apparatus 108 and the electric generator 110 via the gas conduits 120c and 120d, respectively. In this manner, CNG can be stored at a relatively high pressure, and the pressure can be reduced as needed to fuel one or more devices.

In some cases, the fuel regulation apparatuses 104a-b can each include one or more gas valves, flow limiters, or other devices to regulate the pressure of gaseous fuel. In some cases, the fuel regulation apparatus 104a-b can include one or more gas pressure regulators (e.g., a manual, direct-acting, self-operating, spring-loaded adjustable regulator). In some cases, a gas pressure regulator can include an internal relief valve that limits the pressure within a gas conduit 120a-c to a particular maximum pressure. This enables the gas pressure regulator to reduce the risk of "shock" from abrupt changes in downstream conditions (e.g., conditions that might otherwise introduce a sudden changes in pressure in a gas conduit 120a-c), and can be beneficial, for example, in reducing the risk of interruption or failure during the operation of the system. Gas pressure regulators can be manufactured using various materials (e.g., having a body composed, at least in part, of ductile cast iron or WCB steel, and a bonnet composed, at least in part, of aluminum. As an example, the fuel regulation apparatuses 104a-b can include one or more BelGAS P200 gas pressure regulators (BelGAS, Newell, W. Va.).

Although example pressures are described herein, these are merely illustrative examples. In practice, the pressure can vary, depending on the storage and usage requirements of each of the components of the vehicle 100. As an example, in some cases, the fuel storage apparatus 102 can store CNG or other gaseous fuel at a lower pressure (e.g., less than 2,900 psi) or at a higher pressure (e.g., greater than 3,600 psi). Similarly, the fuel regulation apparatus 104a and 104b can provide CNG or other gaseous fuel at pressures other than 120 psi and 1 psi, depending on the requirements of their downstream devices.

The propulsion system 106 propels the vehicle 100 using gaseous fuel. As an example, the propulsion system can include an engine that generates mechanical energy using CNG as fuel, a drivetrain coupled to one or more drive axles and/or wheels, and a transmission that applies the generated mechanical energy to the drivetrain to drive the vehicle (e.g., by rotating the drive axles or wheels). In some cases, the fuel regulation apparatus 104*a* can provide CNG at a pressure of approximately 120 psi to the engine of the propulsion system 106 via the gas conduit 120*b*, and the engine can generate mechanical energy (e.g., rotational energy) using the received CNG. In some cases, the vehicle 100 can contain only propulsion systems that operate using gaseous fuel (e.g., CNG), and not include any propulsion systems that operate using gasoline or diesel. As an example, the propulsion system 106 can include a Ford Triton 5.4 L V8 spark-ignited engine (Ford Motor Co., Dearborn, Mich.).

The cooking apparatus 108 generates heat suitable for cooking using gaseous fuel. As an example, a cooking apparatus 108 can include one or more stoves, ovens, water heaters, griddles, or grills that generate heat by igniting and burning CNG. A user can cook or otherwise prepare food by placing the food close to or in contact with the burning CNG, or close to or in contact with a heat element heated by burning CNG (e.g., a grill top or range). In some cases, the fuel regulation apparatus 104*b* can provide CNG at a pressure of approximately 1 psi to the cooking apparatus 108 via the gas conduit 120*c*, and the cooking apparatus 108 can generate heat using the received CNG. As an example, the cooking apparatus 108 can include Vulcan VCRG48-M1 griddle (Vulcan, Baltimore, Md.).

The electric generator 110 generates electrical current using gaseous fuel. As an example, the electric generator 110 can include one or more devices that generate mechanical energy using the CNG as fuel (e.g., a CNG-operated engine), convert the generated mechanical energy to electrical energy (e.g., via an inductor), and output the electrical energy for use by one or more output devices. In some cases, the electric generator 110 can output electrical energy as a direct current (DC), such as a 12 VDC electrical signal. In some cases, the electric generator 110 can output electrical energy as an alternating current (AC), such as a 120 VAC or 230 VAC electrical signal. In some cases, the fuel regulation apparatus 104*b* can provide CNG at a pressure of approximately 1 psi to the electric generator 110 via the gas conduit 120*d*, and the electric generator 110 can generate electrical energy using the received CNG. In some cases, the vehicle 100 can contain only electric generators that operate using gaseous fuel (e.g., CNG), and not include any electric generators that operate using gasoline or diesel. As an example, the electric generator 110 can include a Caterpillar G25LTA electric generator (Caterpillar Inc., Peoria, Ill.).

The electric generator 110 outputs electrical energy to an electrical panel 112 via an electrical conduit 122*a* (e.g., one or more wires, or other electrical conductors). In turn, the electrical panel 112 distributes the electrical energy to one or more electrical devices 114 via an electrical conduit 122*b*. As an example, the electrical panel 112 can output electrical energy to one or more electrically powered cooking apparatuses (e.g., electrically powered stoves, ovens, water heaters, griddles, grills, microwaves, etc.). As another example, the electrical panel 112 can output electrical energy to one or more electrically powered food storage devices (e.g., refrigerators, coolers, freezers, etc.). As another example, the electrical panel 112 can output electrical energy to one or more other devices (e.g., lights, radios, stereo equipment, speakers, display devices such as televisions and monitors, computers, cash registers, telephones, or any other electrically powered devices). In some cases, the electrical panel 112 can distribute electrical power to one or more standardized vehicular and/or household electrical outlets, such that electrical power can be readily provided to a wide array of commonly used electrical devices via the outlets.

In some cases, the electrical panel 112 can convert the electrical energy received from the electric generator 110, such that is compatible with particular electrical devices (e.g., by modifying the current, voltage, and/or transient properties of the received electrical signal, and outputting the modified electrical signal). As an example, the electrical panel 112 can receive a 120 VAC electrical signal from the electric generator 110, convert the electrical signal to a 12 VDC electrical signal, and output the converted electrical signal to the electrical device 114.

The vehicle 100 also includes a battery 116 electrically coupled to the electric generator 110 and the electrical panel via electrical conduits 122*c* and 122*d*, respectively. The battery 116 stores electrical energy (e.g., electrical energy generated by the electric generator 110). The battery also outputs electrical energy to power electrical devices. For example, electrical panel 112 can draw electrical energy from the battery 116 via the electrical conduit 122*d*, and distribute the electrical energy to the electrical device 114 via the electrical conduit 122*b*. Example batteries 116 can include, for example, lead-acid batteries, a nickel cadmium (NiCd) batteries, a nickel metal hydride (NiMH) batteries, lithium ion (Li-ion) batteries, and lithium ion polymer (Li-ion polymer) batteries.

In some cases, the battery 116 can provide electrical energy when the electric generator 110 is not in operation (e.g., to act as a backup source of power when the electric generator 110 is malfunctioning, switched off, or otherwise not in operation). This can be beneficial, for example, as it enables the user to continue operating electrical devices of the vehicle 100, even if the electric generator is broken or switched off. This is also beneficial, for example, as it enables the user to continue operating electrical devices while conserving fuel (e.g., by not continuously operating the electric generator 110).

In some case, the battery 116 can provide electrical energy in conjunction with the electric generator 110. For example, while the electric generator 110 is in operation, the battery 116 can simultaneously provide additional electrical energy to the electrical panel 112, thereby increasing the total amount of electrical energy provided to the electrical panel 112. This can be useful, for example, if the electrical device 114 draws a greater amount of power than can be provided by the electric generator 110 alone.

In some cases, the electrical panel 112 can monitor the amount of power drawn by the electrical device 114, and selectively draw additional electrical energy from the battery 116 when needed to operate the electrical device 114. This can be useful, for example, as it enables a user to operate electrical device that draw a large amount of electrical energy over a relatively limited amount of time (e.g., a high-drain electrical device that is operated sporadically, such as a microwave).

The vehicle 100 also includes a solar panel 118 electrically coupled to the battery 116 via an electrical conduit 122*e*. The solar panel 118 absorbs light (e.g., light incident upon one or more surfaces of the solar panel 118), generates electrical energy in response to the absorbed light, and transmits the electrical energy to the battery 116 for storage. Solar panel 118 can include, for example, one or more photovoltaic devices such as crystalline silicon (c-Si) solar cells and thin-film cells (e.g., cell constructed using cadmium telluride, CIGS and amorphous silicon).

In some cases, electrical energy generated by the solar panel 118 can be used to power specific electrical devices (e.g., one or more specific electrically powered cooking apparatuses, electrically powered food storage devices, and/ or other electrical devices). For example, in some cases, the exterior lights of the vehicle 100 and/or an electrically powered water heater can be powered by the electrical energy generated by the solar panel 118. In some cases, one or more electrical devices can be entirely powered by the electrical energy generated by the solar panel 118. In some cases, one or more electrical devices can be partially powered by the electrical energy generated by the solar panel 118.

Each of the components shown in FIG. 1 can be secured, either temporarily or permanently, to the vehicle 100. In some cases, one or more of the components shown in FIG. 1 can be mounted within the vehicle 100 (e.g., without a cargo bay, passenger area, engine compartment, or other area within the vehicle). In some cases, one or more of the components shown in FIG. 1 can be mounted on an exterior surface of the vehicle (e.g., a roof, a door, a trunk lid, a hood, an undersurface, or other exterior portion of the vehicle). As an example, the fuel storage apparatus 102 can be mounted to an underside of the vehicle 100, the solar panel 118 can be mounted to a roof of the vehicle 100, and the other components can be secured within the interior of the vehicle 100.

Although example components are shown in FIG. 1, this is merely an illustrative example. In practice, a vehicle can include exclude components shown in FIG. 1, and/or include additional components beyond those shown in FIG. 1, depending on the implementation. Further, although FIG. 1 shows a vehicle having a particular number of each component, in practice, a vehicle can include any number of each component. For instance, a vehicle can include any number of fuel storage apparatuses, fuel regulation apparatuses, propulsion systems, cooking apparatuses, electric generators, electrical panels, electrical devices, batteries, and/or solar panels (e.g., zero, one, two, three, four, or more of each). As an example, a vehicle can include two fuel storage apparatuses, two fuel regulation apparatuses, one propulsion system, three cooking apparatuses, one electric generator, one electrical panel, five electrical devices, two batteries, and three solar panels. Other combinations are also possible.

Figure 2A:
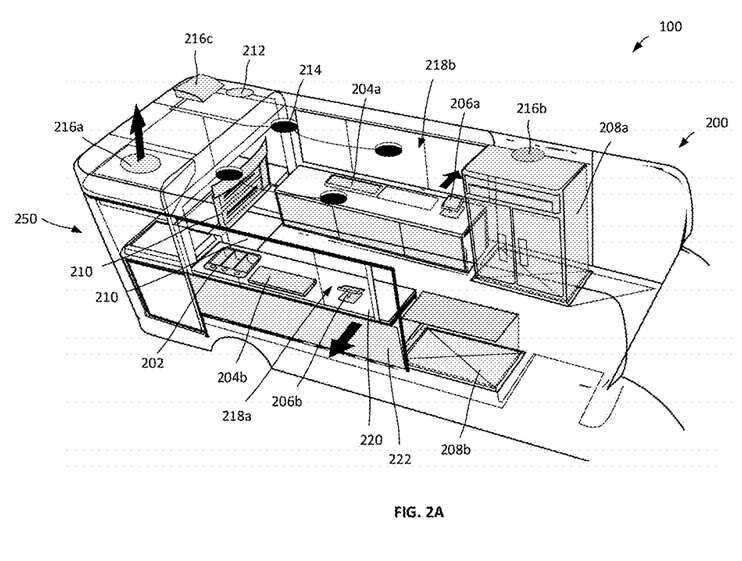
FIG. 2A is a perspective view of an example vehicle for preparing and serving food.

Although a vehicle 100 is shown schematically in FIG. 1, in practice, the components of the vehicle 100 can have any physical arrangement. As an example, FIG. 2A shows a perspective view of a vehicle 100 and various components located on the exterior and/or interior of the vehicle 100. For ease of illustration, only the cargo compartment 200 of the vehicle 100 is shown in FIG. 2A. However, it is understood that the vehicle 100 can include other components to facilitate driving and/or food preparation. For example, the vehicle 100 can include a driver's cabin (e.g., located in front of the cargo compartment 200) that houses control mechanisms (e.g., a steering wheel, pedals, shifters, and/or other mechanisms) that enable a user to control the operation of the vehicle 100.

In the example shown in FIG. 2A, the vehicle 100 includes a sink 202, coolers 204a and 204b, point of sales (POS) systems 206a and 206b, refrigerators 208a and 208b, an oven 210, a gas-fueled water heater 212, lights 214, and exhaust fans 216a-c. As described above, each of these components can be powered by electrical energy (e.g., electrical energy generated by an electric generator 110, electrical energy generated by a solar panel 118, and/or electrical energy drawn from a battery 116) and/or using CNG as fuel.

For example, the sink 202 can include one or more electrically-powered pumps that draw water from a storage tank and dispense the water over a basin for use.

As another example, the coolers 204a and 204b and the refrigerators 208a and 208b can each include one or more electrically-powered cooling elements (e.g., heat pumps) that transfer heat from the inside of the cooler or refrigerator to the external environment, such that the inside of the cooler or refrigerator is cooled to a temperature below the ambient temperature of the external environment.

As another example, the POS systems 206a and 206b can include one or more electronic computing devices (e.g., computers, tablets, smartphones, cash registers, display devices, etc.) that are operable to electronically manage orders (e.g., generate and process bills for customers, manage pending orders by customers, maintain a record of transactions, and so forth).

As another example, the oven 210 can include one or more electrically-powered heating elements that are operable to heat and cook food. As another example, the oven 210 can include or more fuel-powered heating elements that are operable to heat and cook food. In some cases, the oven 210 can be an open-flame oven (e.g., an oven operable to provide flames directly in the area in which food is placed).

As another example, the gas-fueled water heater 212 can include one or more heating elements that are operable to heat water (e.g., by burning CNG to generate heat).

As another example, the lights 214 can include one or more electrically-powered lighting elements (e.g., LEDs, incandescent lights, fluorescent lights, etc.) that are operable to illuminate the interior and/or exterior of the vehicle 100.

As another example, the exhaust fans 216a-c can include one or more electrically-powered air circulation devices (e.g., motors that rotatably drive blades) to create currents of air for cooling and/or ventilation. The exhaust fans 216a-c can vary, depending on the implementation. For instance, in some cases, the exhaust fans 216a-c can each be an approximately 300 cubic feet per minute (CFM) fan that draws air out of the vehicle 100 (e.g., to cool the interior of the vehicle 100 and/or ventilate the interior of the vehicle 100). Other exhaust fans are also possible, depending on the implementation.

In some cases, the cargo compartment 200 can be configured such that customers can be conveniently served from multiple sides of the vehicle 100 (e.g., from the left side and from the right side of the vehicle 100). For example, as shown in FIG. 2A, the cargo compartment 200 includes a first service window 218a (e.g., on the right side of the vehicle 100) and a second service window 218b (e.g., on the left side of the vehicle 100), through which users within the cargo compartment 200 can interact with customers and exchange items to and from the customers. Further, the components within the cargo compartment 200 can be arranged such that food can be conveniently prepared and served from either side of the vehicle 100. In some cases, the service windows 218a and 218b can be selectively covered (e.g., through sliding panes 220 and/or swinging panels 222) to reversibly expose or cover the service windows 218a and 218b.

Figure 2B:
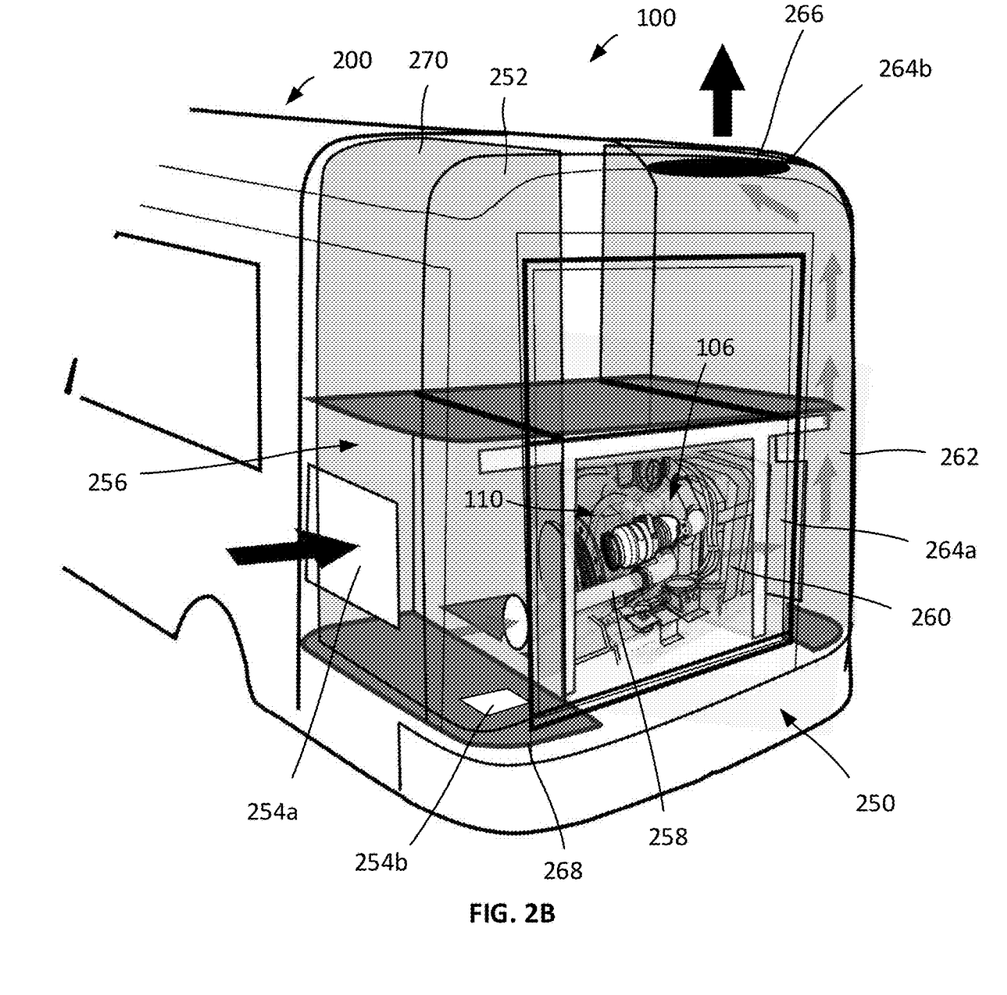
FIG. 2B is another perspective view of the example vehicle shown in FIG. 2A.

As shown in FIG. 2A, in some cases, the electric generator 110 and the propulsion system 106 can be stored in a mechanical compartment 250 separate from the cargo compartment 200 (e.g., in a mechanical compartment 250 located behind the cargo compartment 200). The mechanical compartment 250 in FIG. 2A is shown in greater detail in FIG. 2B. As shown in FIG. 2B, the mechanical compartment 250 houses the electric generator 110 and portions of the propulsion system 106 (e.g., the engine). In some cases, the electric generator 110 and the propulsion system 106 can be implemented as an integrated system (e.g., the engine of the propulsion system 106 can generate mechanical power, which is converted into electrical power by the electric generator 110). In some cases, the mechanical compartment 250 can be isolated from the cargo compartment 200, such that the amount of noise and/or exhaust entering the cargo compartment 200 from the mechanical compartment 250 is reduced or eliminated. As an example, as shown in FIG. 2B, the mechanical compartment 250 can be separated from the cargo compartment 200 by a wall 252.

During operation, the electric generator 110 and/or the propulsion system 106 intake air from the ambient environment, and expel exhaust air back into the ambient environment (e.g., air containing byproducts generated during the operation of the electric generator 110 and/or the propulsion system 106). In some cases, the air intake area(s) of the vehicle 100 can be physically separated from the exhaust area(s) of the vehicle 100. This can be useful, for example, as exhaust from an electric generator and/or propulsion system is typically relatively hot. Physically separating the air intake area(s) from the exhaust area(s) enables the electric generator 110 and/or the propulsion system 106 to run at a cooler operating temperature (e.g., as relatively hot exhaust air is less likely to be draw back into the electric generator 110 and/or the propulsion system 106).

In some cases, this enables the vehicle 100 to operate in environments that might otherwise be difficult or impossible. For example, in a relatively hot environment (e.g., a hot outdoor environment with relatively little wind or other air circulation), the vehicle 100 might otherwise be incapable operating, or might be capable of operating for only a limited amount of time. By separating the air intake area(s) and exhaust area(s), the vehicle 100 can potentially operate for a longer period of time.

For instance, in some cases, an optimal or preferred operating temperature of the electric generator 110 can be between approximately 178° F. and 181° F. If the operating temperature of the electric generator 110 exceeds this range, the electrical generator 110 may begin to overheat and operate less efficiently. Further, if the operating temperature of the electric generator 110 is sufficiently high (e.g., greater than approximately 200° F.), the electric generator 110 may cease to function entirely. Similarly, if the electric generator 110 and the propulsion system 106 are implemented as an integrated system, the engine of the propulsion system 106 may likewise begin to operate less efficiently, then cease to function entirely as the temperature increases. By separating the air intake area(s) and exhaust area(s), the operating temperature of the electric generator 110 and/or the engine of the propulsion system 106 can be maintained within an optimal or preferred operating temperature, such that the vehicle 100 can operate efficiently and/or for a longer period of time. In some cases, this enables the vehicle 100 to operate continuously in an ambient environment having a temperature between approximately 90° F. and 100° F., which might otherwise be difficult or impossible. Although example parameter values are described above, these are merely illustrative examples. Other parameter values are also possible, depending on the implementation.

Further, this also enables the vehicle 100 to operate more efficiently (e.g., by reducing the amount of airborne contaminants that are drawn into the electric generator 110 and/or the propulsion system 106, which may reduce their operational efficiency). Further still, this enables the vehicle 100 to expel exhaust air away from users or customers, thereby increasing the safety and comfort of those around the vehicle 100.

As an example, as shown in FIG. 2B, the mechanical compartment 250 includes air intake ports 254a and 254b extending through one or more exterior surfaces of the vehicle 100 (e.g., through a side surface and/or a bottom surface of the vehicle 100). Ambient air is drawn through the air intake ports 254a and 254b and into an air chamber 256. In turn, air from the air chamber 256 is supplied to the electric generator 110 and/or the propulsion system 106 through a fresh air intake conduit 258 (e.g., a gas-tight pipe or tube extending through a wall separating the air chamber 256 from the mechanical compartment 250).

In some cases, the electric generator 110 and/or the propulsion system 106 can intake ambient air through other pathways, either instead or in addition to take described above. For example, as shown in FIG. 2B, the electric generator 110 and/or the propulsion system 106 can include an air intake 260 that draws ambient air from the environment directly surrounding the electric generator 110 and/or the propulsion system 106 (e.g., within the mechanical compartment 250 itself).

Exhaust air from the electric generator 110 and/or the propulsion system 106 are expelled into the ambient environment at a separate area(s) from the intake areas(s). For example, as shown in FIG. 2B, exhaust can be expelled from the electric generator 110 and/or the propulsion system 106 into an exhaust chamber 262 through exhaust air conduit (e.g., a gas-tight pipe or tube extending through a wall separating the air chamber 262 from the mechanical compartment 250). The exhaust in the air chamber 262 can be drawn from the vehicle 100 through one or more exhaust fans (e.g., exhaust fans 264a and 264b) and expelled into the ambient environment via an exhaust port 266.

The air chambers 256 and 262 can provide various benefits. For example, the air chamber 256 can act as a storage compartment for fresh air, and can improve the aspiration of the electric generator 110 and/or the propulsion system 106. As another example, the air chamber 262 can act as a storage compartment for exhaust air, and can temporarily store exhaust air until it is safely expelled from the vehicle (e.g., through the exhaust port 266). Further, the air chambers 256 and 262 can act as insulative barriers against heat and/or sound generated by the electric generator 110 and/or the propulsion system 106, and can improve the safety and comfort of people situated near the vehicle (e.g., customers standing by the service windows of the vehicle).

In some cases, the air chambers 256 and 262 can have physical arrangements that enhance their storage and/or insulting properties. For example, in some cases, the air chambers 256 and 262 can be substantially enclosed, such that air (e.g., ambient air or exhaust air) substantially enters and exits the air chambers 256 and 262 only via specific apertures (e.g., intake ports, exhaust ports, and/or conduits for conveying air between various components of the vehicle 100).

As another example, in some cases, each of the air chambers 256 and 262 can have a length, a width, and/or a height that extends along a sufficient portion of the length, the width, and/or the height vehicle 100, such that the air chambers 256 and 262 provide a substantial degree of storage and/or insulation.

For example, with respect to the height of an air chamber 256 or 262, an air chamber 256 or 262 can extend along approximately 20%, 40%, 50%, 60%, 70%, 80%, 90%, or some other portion of the height of the vehicle. The height of the vehicle can measure, for example, from a floor 268 of the vehicle to a roof 270 of the vehicle. In some cases, an air chamber 256 or 262 can extend substantially along at least the entire height of the mechanical compartment 250 (e.g., having at least the same height as the mechanical compartment 250, extending along 90% or more of the height of the mechanical compartment 250, etc.). In some cases, an air chamber 256 or 262 can have a height of approximately 2 feet to 10 feet. In some cases, an air chamber 256 or 262 can extend substantially along the entire height of the vehicle (e.g., having approximately the same height as the vehicle, extending along 90% or more of the height of the vehicle, etc.).

As another example, with respect to the length of an air chamber 256 or 262 (e.g., in the dimension extending from the front of the vehicle to the rear of the vehicle), an air chamber 256 or 262 can extend along approximately 50%, 60%, 70%, 80%, 90% or some other portion of the length of the mechanical compartment 250. The length of the mechanical compartment 250 can be measured, for example, from a front of the mechanical compartment 250 to the rear of the mechanical compartment 250. In some cases, an air chamber 256 or 262 can have a length of approximately 2 feet to 10 feet. In some cases, an air chamber 256 or 262 can extend substantially along at least the entire length of the mechanical compartment 250 (e.g., having approximately the same length as the mechanical compartment 250, extending along 90% or more of the length of the mechanical compartment 250, etc.).

As another example, with respect to the width of an air chamber 256 or 262 (e.g., the dimension extending from the left side of the vehicle to the right side of the vehicle), an air chamber 256 or 262 can have a width of approximately 1 feet to 4 feet.

In some cases, the air chambers 256 and 262 can have different dimension relative to one another. For example, in some cases, the air chamber 256 can extend substantially along at least the entire height of the mechanical compartment 250 (e.g., between 3 feet to 5 feet), and the air chamber 262 can extend substantially along the entire height of the vehicle (e.g., between 7 feet to 10 feet).

Although example dimensions are provided, these are merely illustrative examples. Other dimensions are also possible, depending on the implementation.

As described herein, the air intake area(s) of the vehicle 100 can be physically separated from the exhaust area(s) of the vehicle 100. For instance, in the example shown in FIG. 2B, the intake area(s) of the vehicle 100 are along the bottom-left side and bottom-center side of the vehicle 100 (e.g., within the mechanical compartment 250), while the exhaust area(s) of the vehicle 100 are along the top right side of the vehicle 100. Thus, the exhaust air is less likely to be draw back into the electric generator 110 and/or the propulsion system 106.

Although an example configuration is shown in FIG. 2B, this is merely an illustrative example. In practice, some or all of the components of the mechanical compartment 250 can be differently arranged, while still maintaining sufficient separation between the air intake area(s) and exhaust area(s) of the vehicle 100 (e.g., such that heated exhaust air is not drawn back into the electric generator 110 and/or the propulsion system 106 to a substantial degree).

In some cases, the air intake area(s) and the exhaust area(s) can be physically separated with respect to the length of the vehicle 100 (e.g., one area can be closer to the front of the vehicle, while another area can be closer to the back of the vehicle), physically separated with respect to the height of the vehicle 100 (e.g., one area can be closer to the top of the vehicle, while another area can be closer to the bottom of the vehicle), and/or physically separated with respect to the width of the vehicle 100 (e.g., one area can be closer to the left of the vehicle, while another area can be closer to the right of the vehicle).

In some cases, the air intake area(s) and the exhaust area(s) can be physically separated with respect to the distance between the areas. For example, in some cases, the air intake area(s) are separated from the exhaust area(s) by at least one foot, two feet, three feet, four feet, or some other distance sufficient to prevent exhausted exhaust from being drawn back into the electric generator 110 and/or the propulsion system 106 to a substantial degree.

In some cases, the air intake area(s) and the exhaust area(s) can be configured such that the direction(s) of air intake are different than the direction(s) of exhaust. For example, in some cases, the direction of air intake and exhaust can be substantially different (e.g., a 45° difference, a 90° difference, or some another difference with respect to a common plane). As another example, in some cases, the direction of air intake and exhaust can be substantially different, such that they do not extend into a common area with respect to the vehicle (e.g., a common area with respect to the left/right directions, top/bottom directions, and/or front/rear directions of the vehicle).

In some cases, some or all of the factors described herein can be used to position the air intake area(s) with respect to the exhaust area(s), either individually or in any combination.

A number of implementations have been described. Nevertheless, it will be understood that various modifications may be made without departing from the spirit and scope of the disclosure. Accordingly, other implementations are within the scope of the following claims.

What is claimed is:

1. A system comprising:
    a vehicle having a propulsion system;
    an electric generator;
    a cooking apparatus;
    a fuel storage apparatus configured to store compressed natural gas (CNG);
    a fuel regulation apparatus coupled to the fuel storage apparatus and configured to deliver CNG to the electric generator, the propulsion system, and the cooking apparatus;
    an air intake system configured to intake air from an ambient environment via an intake port, and supply the air to at least one of the propulsion system or the electric generator,
        wherein the air intake system comprises a first air chamber disposed between the intake port and at least one of the propulsion system or the electric generator,
        wherein the first air chamber is defined, at least in part, by a first outer wall of vehicle and a first inner wall of the vehicle separating at least one of the propulsion system or the electric generator from the first air chamber, and
        wherein the air intake system is configured to intake air into the first air chamber from the ambient environment via the intake port, and supply the air from the first air chamber to at least one of the propulsion system or the electric generator via an intake conduit extending between the first air chamber and at least one of the propulsion system or the electric generator; and an exhaust system configured to expel exhaust air from at least one of the propulsion system or the electric generator into the ambient environment via an exhaust port, wherein the intake port is physically separated from the exhaust port.

2. The system of claim 1, wherein the intake port is positioned along a first side of the vehicle, and wherein the exhaust port is positioned along a second side of the vehicle different than the first side.

3. The system of claim 1, wherein the intake port is positioned along a lateral side of the vehicle, and wherein the exhaust port is positioned along a top side of the vehicle.

4. The system of claim 1, wherein the air intake system is configured to intake air from the ambient environment in a first direction; and wherein the exhaust system is configured to expel exhaust air in a second direction different than the first direction.

5. The system of claim 1, wherein the first air chamber extends along at least 50% of a height of the vehicle.

6. The system of claim 1, wherein the exhaust system comprises a second air chamber disposed between the exhaust port and at least one of the propulsion system or the electric generator, and wherein the exhaust system is configured to direct exhaust air from at least one of the propulsion system or the electric generator into the second air chamber, and expel the exhaust air from the second air chamber into the ambient environment via the exhaust port.

7. The system of claim 6, wherein the second air chamber extends along at least 50% of a height of the vehicle.

8. The system of claim 1, wherein the intake conduit extends through the first inner wall.

9. The system of claim 1, wherein the intake port extends through the first outer wall.

10. The system of claim 9, wherein the first air chamber is defined, at least in part, by a bottom wall, and wherein the air intake system is configured to intake air into the first air chamber from the ambient environment via a second intake port, the second intake port extending through the bottom wall.

\* \* \* \* \*